(12) United States Patent
Kawada et al.

(10) Patent No.: US 6,943,827 B2
(45) Date of Patent: Sep. 13, 2005

(54) APPARATUS FOR MONITORING QUALITY OF PICTURE IN TRANSMISSION

(75) Inventors: Ryoichi Kawada, Saitama (JP); Osamu Sugimoto, Saitama (JP); Masahiro Wada, Saitama (JP); Shuichi Matsumoto, Saitama (JP)

(73) Assignee: KDDI Corporation, Tokyo (JP)

( * ) Notice: Subject to any disclaimer, the term of this patent is extended or adjusted under 35 U.S.C. 154(b) by 516 days.

(21) Appl. No.: 10/118,261

(22) Filed: Apr. 9, 2002

(65) Prior Publication Data

US 2002/0176002 A1 Nov. 28, 2002

(30) Foreign Application Priority Data

Apr. 16, 2001 (JP) .................................. 2001-117226
Sep. 7, 2001 (JP) .................................. 2001-272034
Mar. 1, 2002 (JP) .................................. 2002-055333

(51) Int. Cl.$^7$ .................. H04N 17/00; H04N 17/02
(52) U.S. Cl. .................. 348/180; 348/192; 348/193; 382/309
(58) Field of Search .................. 348/180, 192–193; 725/107, 148; 382/309; 455/67.11; H04N 17/00, 17/02

(56) References Cited

U.S. PATENT DOCUMENTS

| | | | | | |
|---|---|---|---|---|---|
| 5,577,116 | A | * | 11/1996 | Townsend et al. | 379/406.12 |
| 5,596,364 | A | * | 1/1997 | Wolf et al. | 348/192 |
| 5,825,929 | A | * | 10/1998 | Chen et al. | 382/326 |
| 6,075,561 | A | * | 6/2000 | Janko | 348/180 |
| 6,246,435 | B1 | * | 6/2001 | Patel | 348/192 |
| 6,483,538 | B2 | * | 11/2002 | Hu | 348/180 |
| 6,493,023 | B1 | * | 12/2002 | Watson | 348/180 |
| 6,496,221 | B1 | * | 12/2002 | Wolf et al. | 348/192 |
| 6,577,764 | B2 | * | 6/2003 | Myler et al. | 382/228 |
| 6,603,505 | B1 | * | 8/2003 | Kawada et al. | 348/192 |
| 6,798,919 | B2 | * | 9/2004 | Ali et al. | 382/272 |
| 2002/0149675 | A1 | * | 10/2002 | Abraham et al. | 348/192 |

OTHER PUBLICATIONS

T. Hamada, et al. "Picture Quality Assessment by ThreeLayered Bottom–Up Noise Weighting Considering Human Visual Perception" SMPTE Journal, Jan. 1999 (pp. 20–26).

R.J. Clarke, "Transform Coding of Images", Academic Press, Microelectronics and Signal Processing Series, 1985, pp. 291–335.

* cited by examiner

Primary Examiner—Brian P. Yenke
(74) Attorney, Agent, or Firm—Westerman, Hattori, Daniels & Adrian, LLP

(57) ABSTRACT

A first characteristic value extracting unit extracts a characteristic value from a picture transmitted from a transmission side, and a second characteristic value extracting unit extracts a characteristic value from a picture received on a reception side. These extracted characteristic values are supplied to a central monitoring unit through low speed lines, respectively. In the central monitoring unit, an MSE (mean square error) is assessed from the data by an MSE assessing unit. The first and second characteristic value extracting units divide an input picture into blocks, subject the blocks to an orthogonal transformation, or subject the blocks to PN sequence multiplication before the orthogonal transformation, and extract and output orthogonal transformation coefficients. The MSE assessing unit determines the differences between corresponding coefficients on the transmission side and the reception side and squares the differences, adds the squared differences for every coefficients or every blocks, and assess an MSE based on the added values referred to a table. With this operation, the MSE can be effectively assessed using a smaller amount of extracted data (accordingly, slower speed lines can be used in the central monitoring unit).

12 Claims, 8 Drawing Sheets

(SDTV)

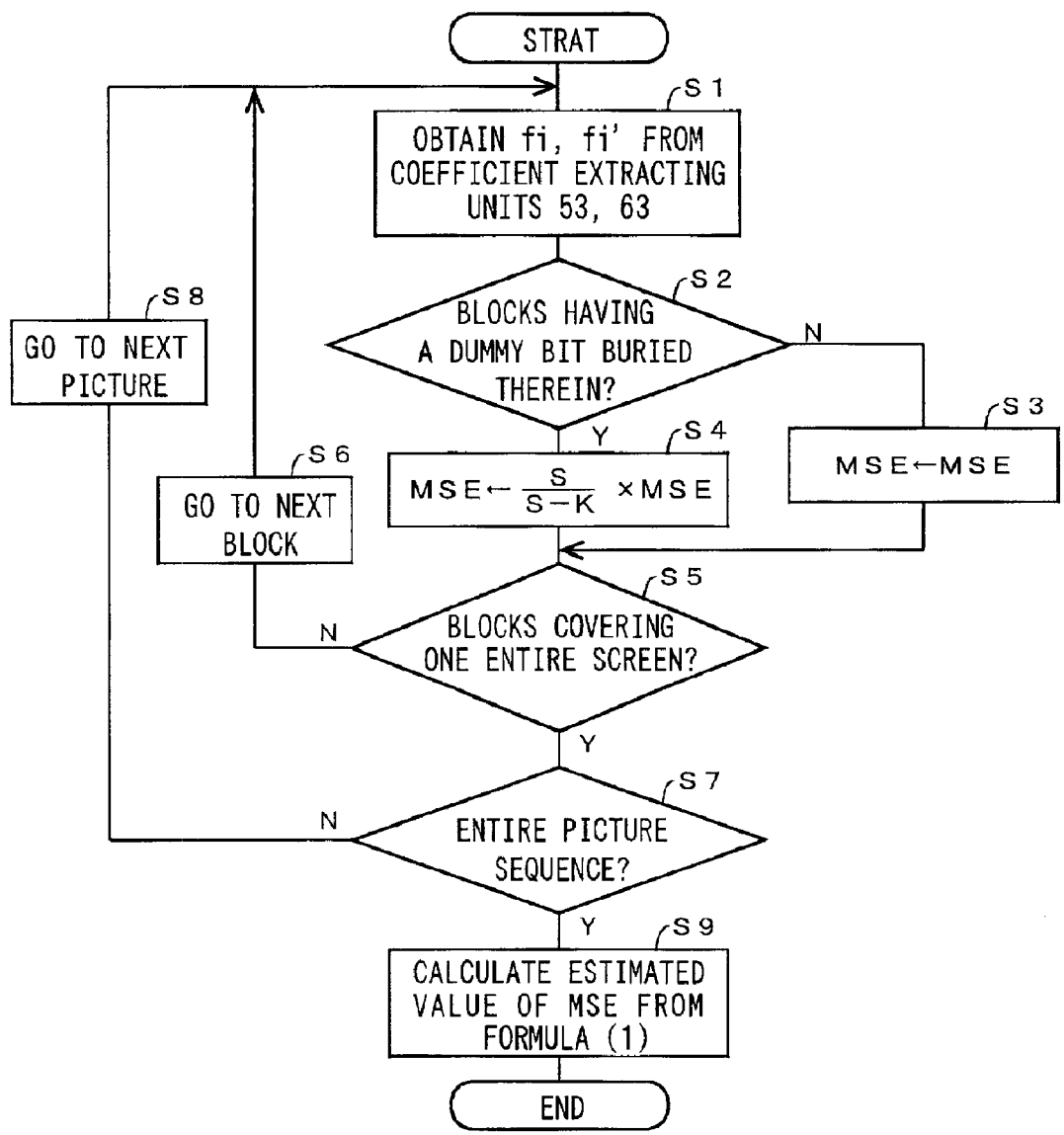

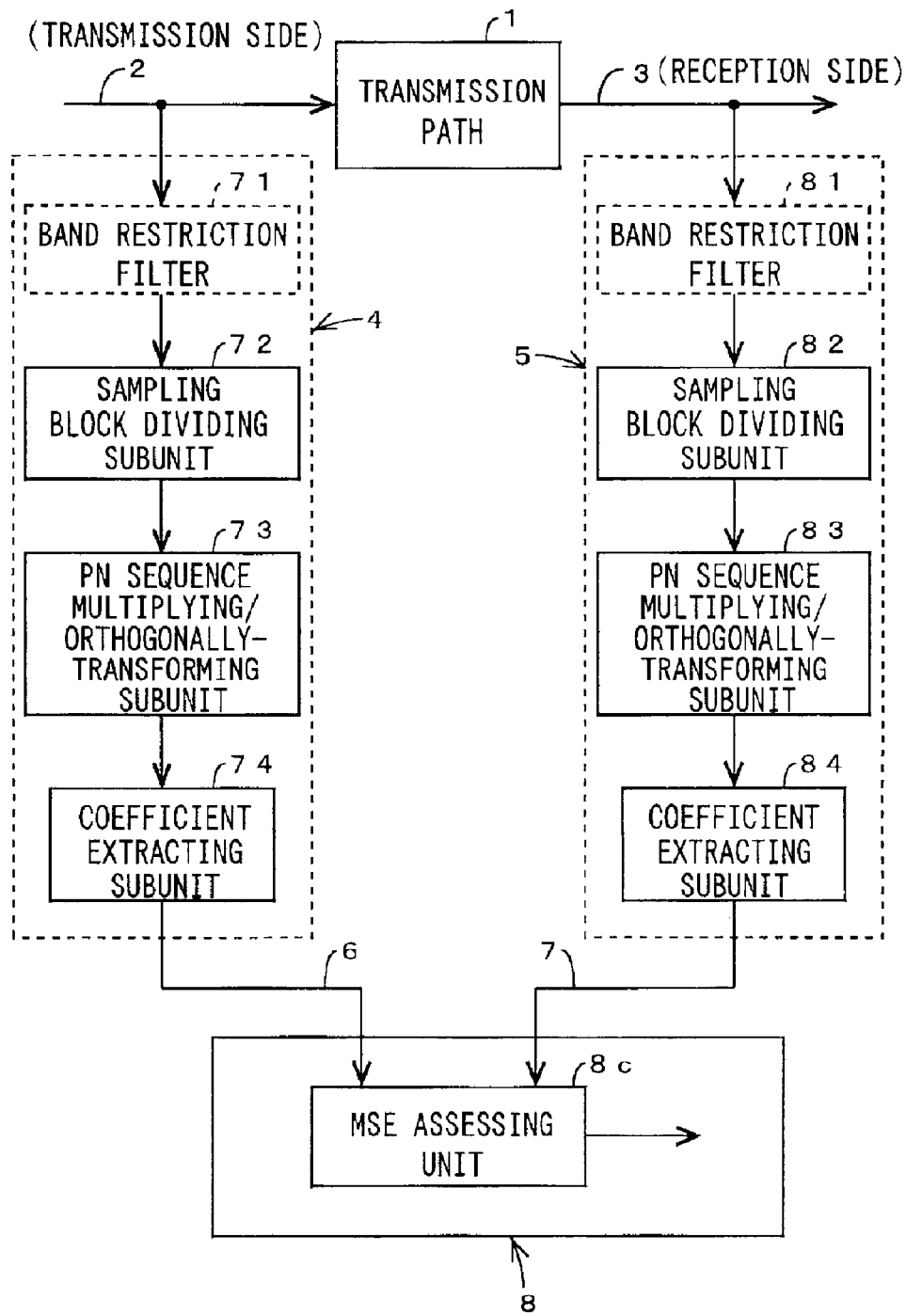

APPARATUS FOR MONITORING QUALITY OF PICTURE IN TRANSMISSION

BACKGROUND OF THE INVENTION

1. Field of the Invention

The present invention relates to an apparatus for monitoring quality of a picture in transmission that is preferable to collectively remote-monitor at a center the picture or video picture quality at a plurality of transmission processing positions disposed in sequence in a transmission path.

2. Description of the Related Art

As a conventional method of automatically monitoring and assessing video picture quality, there are available (1) a method of comparing a processed picture with its original picture, (2) a method of assessing picture quality based on only a processed picture, and (3) a method of comparing the characteristic value of an original picture with that of a processed picture.

An example of the method (1) is disclosed in detail in, for example, the following document. T. Hamada. et al. "Picture quality assessment system by three-layered bottom-up noise weighing considering human visual perception", SMPTE Journal, Vol. 108, No. 1, January 1999.

However, it is impossible to use the above method (1) in the actual field of picture transmission. This is because it is only a processed picture that can be obtained and an original picture cannot be used, during the actual transmission of a picture.

Thus, conventionally, only the method (2) or (3) can be substantially employed to monitor and assess the quality of a picture in transmission. However, the precision of assessment of the method (2) is low in principle because it assesses picture quality based on only a processed picture. In contrast, the method (3) can realize monitoring of picture quality with higher precision than the method (2) because in this method some characteristic value of an original picture is transmitted from a transmission side through a low speed transmission path and compared with the same characteristic value on a reception side.

An invention according to the method (3) is filed by the inventors as Japanese Patent Application No. 2000-256015 titled "Apparatus for assessing quality of picture in transmission and apparatus for remote-monitoring quality of picture in transmission".

In the method (3), it is important to assess picture quality as precisely as possible based on a characteristic value of an amount as small as possible. In particular, while it is important to assess a mean square error (hereinafter, abbreviated as "MSE") that is as a base of picture quality assessment, there has been announced neither an apparatus nor a method of assuming the MSE based on a small amount of characteristic value.

The MSE is defined here as follows. When a signal on a transmission side is shown by x(t), a (deteriorated)signal on a reception side is shown by y(t), and the total number of pixels is shown by N, the MSE can be expressed by the following formula (1).

$$MSE = 1/N \cdot \Sigma [X(t) - y(t)]^2 \quad (1)$$

In the above formula (1), t shows a two-dimensional coordinate composed of horizontal and vertical coordinate axes. A sum is determined as to all the pixels.

SUMMARY OF THE INVENTION

It is an object of the present invention to provide an apparatus for monitoring quality of a picture in transmission capable of effectively assessing an MSE based on a small extracted amount (which thereby permits to use a low speed line to a central monitoring unit) when the quality of the picture in transmission is remote-monitored by respectively extracting characteristic values from a transmission side and a reception side.

It is another object of the present invention to provide an apparatus for monitoring quality of a picture in transmission capable of precisely assessing the deterioration of the signal to noise ratio of a received picture that is deteriorated by coding noise in a picture compression coding transmitter, and the like or by an error in a transmission path.

It is still another object of the present invention to provide an apparatus capable of creating blocks to which simple orthogonal transformation, which is suitably arranged as a device, can be applied.

To achieve the above objects, a first feature of the present invention resides in that a means for extracting the characteristic values of picture quality at a plurality of points on a picture transmission path includes a block division means for dividing an input picture into blocks each having an arbitrary size, an orthogonal transformation means for subjecting the pictures in the blocks to an orthogonal transformation, and a frequency component value extraction means for extracting an arbitrary frequency component value of the orthogonal transformation, and a means for assessing an MSE (mean square error) from the characteristic values extracted by the characteristic value extraction means includes a square calculation means for selecting frequency component values at two arbitrary points and determining the square value of the difference between corresponding frequency component values, an addition means for adding an arbitrary number of the square values, and a picture quality deterioration assessment means for assessing the deterioration of picture quality from the added value obtained by the addition means.

According to the first feature, after the picture is divided into blocks each having an arbitrary size, each block is subjected to the orthogonal transformation, thereby the amount of calculation of the orthogonal transformation that is performed at a time can be reduced. Further, since a certain frequency component is extracted from the frequency components obtained by the orthogonal transformation and used to assessment, deterioration can be more easily assessed as compared with a case in which signals are extracted in the same amount by thinning out by extracting them before they are subjected to the orthogonal transformation. This is because the deterioration of the quality of a picture to be assessed such as coding noise, and the like often exists over a wide frequency band.

A second feature of the present invention resides in that a PN sequence multiplication means is disposed behind the orthogonal transformation means for subjecting the signals in blocks to PN multiplication so as to multiply the coefficients having been subjected to the orthogonal transformation by a PN sequence. Further, a third feature of the present invention resides in that a PN sequence multiplication means is disposed in front of and behind the orthogonal transformation means so that coefficients are subjected to the orthogonal transformation after they have been multiplied by a PN sequence and the coefficients having been subjected to the orthogonal transformation are multiplied by a PN sequence. According to the second feature, it is possible to precisely remote-monitor the quality of a picture in transmission with respect to local deterioration due to a transmission path error, and the like. Further, according to the third feature, the quality of a picture in transmission can be precisely remote-monitored with respect to a wide range of deterioration such as coding noise, and the like as well as the local deterioration due to the transmission path error, and the like.

A fourth feature of the present invention resides in that the characteristic value extraction means includes a block division means for dividing an input picture into blocks each having a square shape of a power of "2", an orthogonal transformation means for subjecting the pictures in the blocks to an orthogonal transformation, and a frequency component value extraction means for extracting an arbitrary frequency component value of the orthogonal transformation and the block division means buries a predetermined value in blocks having regions outside of the effective screen of a picture and arranges the blocks as square blocks of the power of "2"

According to the fourth feature, since the blocks having the regions outside of the effective screen of the picture are buried by the predetermined value, it is possible to apply the orthogonal transformation having the size of a power of "2" to a screen having an arbitrary size. As a result, an apparatus for monitoring quality of picture in transmission can be simply arranged.

A fifth feature of the present invention resides in that the characteristic value extraction means includes a block division means for dividing an input picture into blocks each having a square shape of a power of "2" by sampling discrete pixels of the input picture, an orthogonal transformation means for subjecting the pictures in the blocks to an orthogonal transformation, and a frequency component value extraction means for extracting an arbitrary frequency component value of the orthogonal transformation.

According to the fifth feature, when a picture is divided into blocks, the respective blocks are composed of discrete pixels obtained by sampling them in place of that the blocks are composed of adjacent pixels, which permits the wide range on a screen to be covered with relatively small blocks. As a result, the apparatus for monitoring quality of picture in transmission can be simply arranged.

BRIEF DESCRIPTION OF THE DRAWINGS

FIG. 12 is a flowchart explaining operation of an MSE assessing unit of the seventh embodiment; and FIG. 13 is a block diagram showing the schematic arrangement of an eighth embodiment of the present invention.

DETAILED DESCRIPTION OF THE PREFERRED EMBODIMENT

Figure 1:
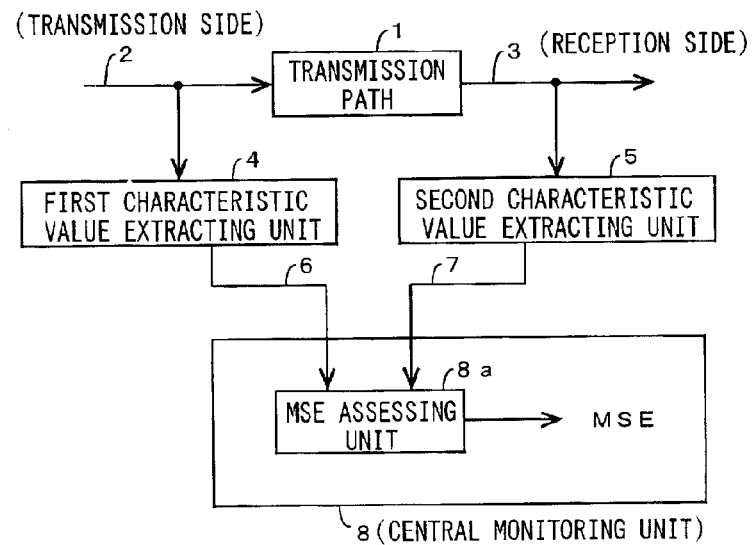
FIG. 1 is a block diagram showing the arrangement of a first embodiment of the present invention.

The present invention will be described below in detail with reference to the drawings. FIG. 1 is a block diagram showing the schematic arrangement of a first embodiment of the present invention applied to a system (referred to as a picture transmission chain) in which a plurality of transmission processing devices are connected in series to a transmission path. FIG. 1 shows an arrangement of a portion of the picture transmission chain.

In FIG. 1, a picture or video picture is transmitted from a transmission side 2 to a reception side 3 through a transmission path 1. A first characteristic value extracting unit 4 extracts the characteristic value of the picture transmitted from the transmission side 2. In contrast, a second characteristic value extracting unit 5 extracts the characteristic value of the picture received on the reception side 3. The characteristic values extracted by the first and second characteristic value extracting units 4 and 5 are supplied to a central monitoring unit 8 through low speed lines 6 and 7, respectively. Data as to the characteristic values is arranged as frequency component values that will be described later. In the central monitoring unit 8, an MSE assessing unit 8a assesses an MSE (mean square error) from this data.

In the present invention, it is an important point to assess the following value, that is, the MSE between the transmitted picture and the received picture from data as small as possible. The MSE can be expressed by the following formula (2).

$$MSE = 1/N \cdot \Sigma[x(t) - yt)]^2 \tag{2}$$

In the above formula, a signal on the transmission side 2 side is shown by x(t) and a (deteriorated) signal on the reception side 3 is shown by y(t).

A picture is intrinsically a two-dimensional signal, it is expressed here as a one-dimensional signal for convenience. If all the values of x(t) and y(t) are obtained in the central monitoring unit 8, a true MSE can be obtained. However, this is ordinarily impossible. Accordingly, the first and second characteristic value extracting units 4 and 5 extract the information (characteristic values) of the transmitted picture and the received picture and transmit the characteristic values through the low bit rate lines 6 and 7 such as phone lines, LAN lines, or the like, and the MSE assessing unit 8a of the central monitoring unit 8 assesses the MSE using these characteristic values.

Here, the embodiment makes use of a feature that noise components acting as a factor of deterioration of picture quality are superimposed over a wide frequency band. That is, when an original signal is subjected an orthogonal transformation by some kind or another method and is expressed as a set of frequency components and only arbitrary frequency components are sampled and supplied to the central monitoring unit 8, it is possible to assess the overall deterioration of the signal from the deterioration of the frequency components to a certain extent. This principle can be said from Parseval's theorem as described below.

The signals obtained by subjecting the signal x(t) on the transmission side 2 and the signal y(t) on the reception side 3 to the orthogonal transformation are expressed by X(f) and Y(f), respectively. Further, when x(t)−y(t)≡z(t), and z(t) subjected to the orthogonal transformation is shown by Z(f), the following formula (3) is established from Parseval's theorem.

$$1/N \cdot \Sigma z(t)^2 = 1/N \cdot \Sigma |Z(f)|^2 \quad (3)$$

Thus, the following formula (4) is established from the formulas (2) and (3).

$$MSE = 1/N \cdot \Sigma [x(t)-y(t)]^2 = 1/N \cdot \Sigma z(t)^2 = 1/N \cdot \Sigma |Z(f)|^2$$

That is, $MSE = 1/N \cdot \Sigma |X(f)-Y(f)|^2 \quad (4)$

That is, MSE is expressed by the sum of squares of the differences between the respective frequency components having been subjected to the orthogonal transformation.

Here, the deterioration of picture quality due to transmission tends to affect white, that is, tends to equally affect the respective frequency components probabilistically. When this is utilized, it is possible to make use a frequency component fi of arbitrary frequency components as an assessed value of the MSE ($\equiv e^2$).

When the assessed value is shown by $\hat{e}_i^2$, $\hat{e}_i^2$ is expressed by the following formula (5).

$$\hat{e}_i^2 = |X(fi)-Y(fi)|^2 \quad (5)$$

That is, the deterioration of picture quality can be assessed by the square of the difference between the input and output values of a certain frequency component.

Further, when it is assumed that respective frequency components are deteriorated independently, the precision of assessment can be more improved by using a plurality of frequency components and averaging the values of them ($\hat{e}_i^2$) determined by the formula (5).

That is, the MSE can be assessed by transmitting only certain frequency components X(fi) and Y(fi) of each block from the transmission side and the reception side.

Figure 2:
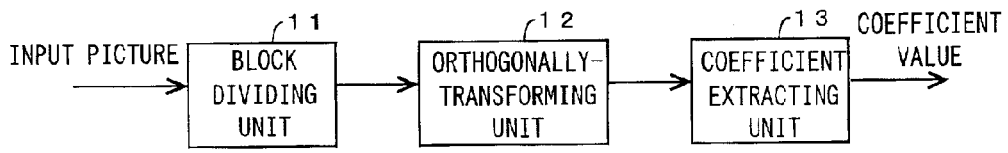
FIG. 2 is a block diagram of a specific example of a characteristic value extracting unit of FIG. 1.

FIG. 2 is a block diagram showing a specific example of the arrangement of the first and second characteristic value extracting units 4 and 5.

An input picture is first supplied to a block dividing unit 11 and divided into blocks. However, the "block" is defined to include an overall picture. Further, the "block" also includes a three-dimensional block (rectangular prism) including a time axis direction. That is, it is possible to use the overall picture as a unit to be subjected to the orthogonal transformation and to perform a three-dimensional orthogonal transformation including the time axis direction as a matter of course.

Next, the blocks are subjected to the orthogonal transformation in an orthogonally-transforming unit 12. Then, a coefficient extracting unit 13 extracts an appropriate coefficient from the coefficients obtained by the orthogonal transformation and supplies it to the central monitoring unit 8.

Figure 3:
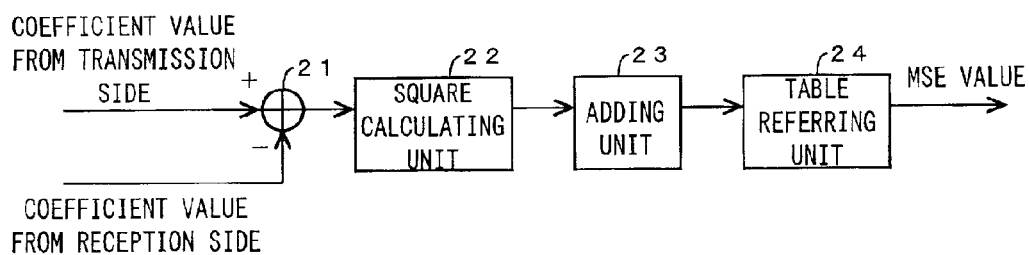
FIG. 3 is a block diagram of a specific example of an MSE assessing unit of FIG. 1.

FIG. 3 is a block diagram showing a specific example of the MSE assessing unit 8a of the central monitoring unit 8.

In the MSE assessing unit 8a, the difference between the coefficient values (amplitude values) at the same positions of corresponding blocks on the transmission side and the reception side is calculated in a subtracting unit 21 and squared in a square calculating unit 22. An adding unit 23 adds arbitrary pieces of the square values, for example, adds the square values of every coefficients and/or blocks. The additive value is applied to a table showing the correlation between the additive value and the MSE in a table referring unit 24, thereby the MSE is assessed.

Figure 4:
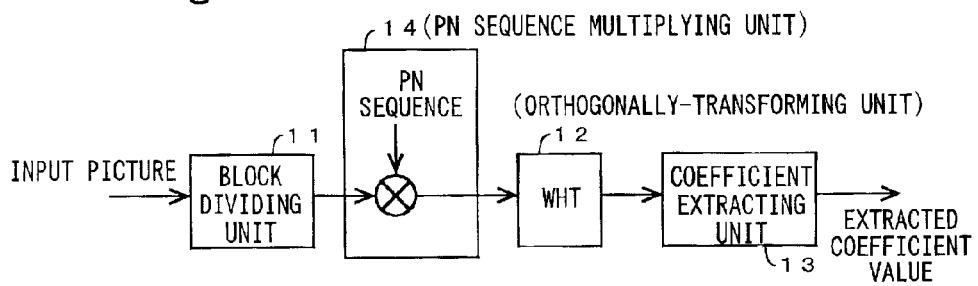
FIG. 4 is a block diagram of a characteristic value extracting unit of a second embodiment.

Next, a second embodiment of the present invention will be described with reference to FIG. 4. FIG. 4 is a block diagram showing a specific arrangement of the first and second characteristic value extracting units 4 and 5.

In FIG. 4, first, an input picture is supplied to a block dividing unit 11 and divided into blocks. However, the "block" is defined as described above. Next, the signals in the blocks are subjected to spectrum spreading in a PN sequence multiplying unit 14. That is, the blocks are multiplied by a PN sequence. The PN sequence may be any arbitrary sequence of numbers in which +1 and −1 are generated at random (such as +1, +1, −1, +1, −1, −1, +1, −1, +1, . . . ). Thereafter, the resultant blocks are subjected to Walsh Hadamard transformation (hereinafter, abbreviated as "WHT"). In a picture G having a block size of, for example, 8×8, the WHT is shown by α as shown below.

α=UGU $$U = \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix}$$

α shows 8×8 pieces of coefficients per block from the above calculation of the above matrix. The coefficient extracting unit 13 extracts any one of the coefficients and transmits it to the central monitoring unit 8. It is needless to say that a plurality of coefficients may be transmitted per block according to a transmittable band width, or no coefficient may be transmitted as to a certain block.

The following merits can be obtained from this embodiment. While it was described before that "the deterioration of picture quality due to transmission tends to affect white, that is, tends to equally affect the respective frequency components probabilistically", it is only a tendency, and some deterioration is biased to a low band side or a high band side in a frequency.

The PN sequence multiplication has an effect for. uniformly dispersing the noise to respective frequency components statistically by multiplying a picture by the PN sequence (pseudo-random sequence in which +1 and −1 are arranged at random). That is, the picture is multiplied by the PN sequence just before it is subjected to the orthogonal transformation of the first embodiment, and then it is subjected to the orthogonal transformation, whereby the precision of assessment performed using the formula (5) can be improved.

Further, a merit obtained by using the WHT as the orthogonal transformation in the second embodiment will be described.

The WHT is one of the orthogonal transformations that can be most simply calculated. That is, since all the calculations can be carried out by addition or subtraction, if it is intended to arrange a device for performing the calculation, it can be very simply arranged regardless of that the calculations are realized by hardware or software (real numbers must be calculated in Fourier transformation). This is the merit of using the WHT as the orthogonal transformation.

Figure 5:
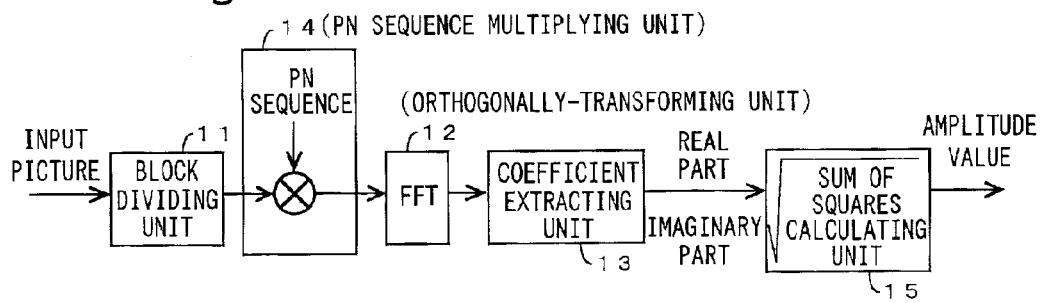
FIG. 5 is a block diagram of a characteristic value extracting unit of a third embodiment.

Next, a third embodiment of the present invention will be described with reference to FIG. 5. FIG. 5 is a block diagram showing a third specific arrangement of the first and second characteristic value extracting units 4 and 5.

FIG. 5 is different from FIG. 4 in that a Fourier transformation FFT is used as an orthogonally-transforming unit 12 and that a sum of squares calculating unit 15 is disposed behind a coefficient extracting unit 13. In FIG. 5, the same reference numerals as those used in FIG. 4 denote the same components or similar components.

A first feature of the third embodiment resides in that the Fourier transformation FFT is used as the orthogonally-transforming unit 12. The Fourier transformation FFT is a most precise and appropriate method of transformation physically in the meaning of frequency spectrum. This is a merit of using the Fourier transformation as the orthogonal transformation. Note that, to realize the third embodiment, it is appropriate to make use of high speed Fourier transformation to reduce an amount of calculation.

Next, a second feature of the third embodiment resides in that when the Fourier transformation FFT is used as the orthogonal transformation, the amplitude value of an arbitrary coefficient component extracted from the coefficient extracting unit 13 is supplied to the central monitoring unit 8 in place of that the real part and the imaginary part thereof is supplied thereto. In the embodiment, since only the amplitude value is transmitted in place of the two types of information, that is, the real part and the imaginary part, the amount of information supplied to the central monitoring unit 8 is reduced to about one half, which permits the central monitoring unit to perform monitoring using low speed lines. In this case, what is important resides in that even if the amount of information is reduced to one half as described above, the MSE can be assessed without reducing the precision thereof. The reason is as described below.

When X(f) and Y(f) described above are used as Fourier transformation coefficients and expressed by being separated to an amplitude part and a phase part, the following formulas (6) and (7) are established.

$$X(f) = A_X(f) e^{-j\phi X(f)} \quad (6)$$

$$Y(f) = A_Y(f) e^{-j\phi Y(f)} \quad (7)$$

Thus, $|X(fi)-Y(fi)|^2$ on the right side of the above formula (5) will be expressed by the following formula.

$$|X(fi)-Y(fi)|^2 = |A_X(fi) e^{-j\phi X(f)} - A_Y(fi) e^{-j\phi Y(f)}|^2$$

Further, assumption is made as described below. That is, the deterioration of quality of a picture in transmission does not affect the phases of the respective frequency components and only affects the amplitude components thereof. Actually, this assumption is reasonable because the deterioration of picture quality that affects the phases means the offset of a picture.

Thus, the above formula (5) can be changed to the following formula (8).

$$\begin{aligned} \wedge e_i^2 &= |A_X(fi) e^{-j\phi X(f)} - A_Y(fi) e^{-j\phi Y(f)}|^2 \quad (8) \\ &= |[A_X(fi) - A_Y(fi)] e^{-j\phi X(f)}|^2 \\ &= |[A_X(fi) - A_Y(fi)]|^2 \end{aligned}$$

That is, the deterioration of picture quality can be assessed by the square of the difference between the input and output values of the amplitude value (=root of energy spectrum density) of a certain frequency component. Thus, it is not necessary to transmit the real part and the imaginary part.

Figure 6:
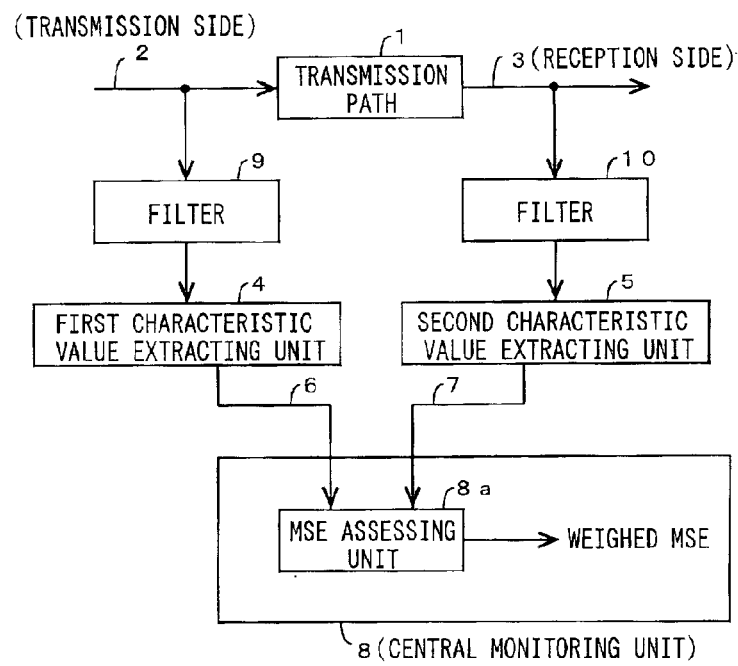
FIG. 6 is a block diagram showing the arrangement of a fourth embodiment.

FIG. 6 is a block diagram showing a fourth embodiment of the present invention. In the fourth embodiment, time special filters 9 and 10, which imitate human visual characteristics, are disposed in front of characteristic value extracting units 4 and 5. Signals having passed through the filters 9 and 10 are subjected to processing similar to that performed in the first to third embodiments, whereby an MSE weighed with visual characteristics can be assessed. A two-dimensional digital filer can be used as these filters. The filter disclosed in "Picture movement assessing apparatus" of Japanese Unexamined Patent Publication No. 7-307925 filed by the applicant, for example, can be used as an example of the two-dimensional digital filter.

According to the first to fourth embodiments described above, it is possible to precisely assess the deterioration of signal to noise ratio of a received picture due to coding noise caused by, for example, a picture compression coding transmitter, and the like. The reason is that the spectrum having been subjected to the orthogonal transformation is made at random by the above PN sequence multiplication, and thus there is an increased tendency that an arbitrarily extracted coefficient represents the entire coefficients when viewed from a statistical point of view.

When, however, an error arises in a digital transmission path, the difference between an original picture and a received picture does not diffuse to an entire picture and appears as a local block-like error. That is, a large amount of deterioration arises in only a certain portion of the received picture and almost no deterioration arises in other portions.

In this case, a sufficient diffusion effect cannot be obtained only by the above PN sequence multiplication (that changes the signs of the respective pixels constituting a picture at random). That is, orthogonal transformation coefficients are not independent of each other and a certain degree of correlation remains. As a result, the precision of an assessed noise to signal ratio is reduced.

A fifth embodiment of the present invention is achieved in consideration of the above point and provides an apparatus for monitoring quality of picture in transmission in which the precision of an assessed noise to signal ratio is not reduced when an error arises in, for example, a digital transmission path.

Figure 7:
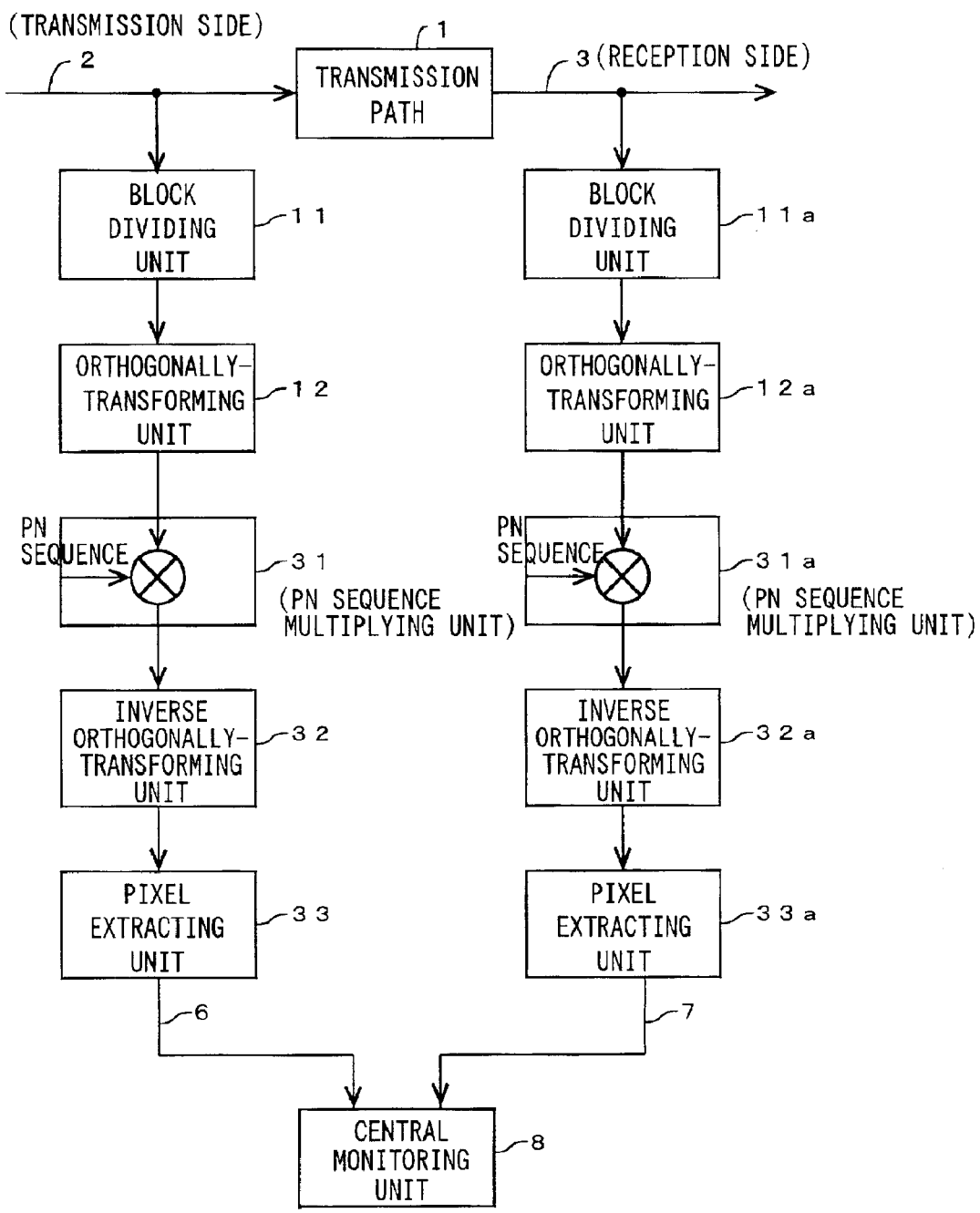
FIG. 7 is a block diagram showing the arrangement of a fifth embodiment.

The fifth embodiment will be described with reference to FIG. 7. In FIG. 7, the same reference numerals as used in FIGS. 1 and 2 denote the same components or similar components.

An input picture on a transmission side 2 is first supplied to a block dividing unit 11 and divided into blocks each having an arbitrary size. The picture having been divided into the blocks is supplied to an orthogonally-transforming unit 12 and subjected to an orthogonal transformation therein.

The transformation coefficients obtained by the orthogonal transformation are supplied to a PN sequence multiplying unit 31, multiplied by a PN sequence in the transformation region and spectrum dispersed. The respective transformation coefficients are changed to transformation coefficients at random by the processing. The detail of this processing is the same as that of the above second and third embodiments. Note that the fifth embodiment has a feature in that respective pixels are multiplied by the PN sequence after they have been subjected to the orthogonal transformation, while they are multiplied by the PN sequence before they are subjected to the orthogonal transformation in the second and third embodiments.

Next, the respective transformation coefficients having been subjected to the PN sequence multiplication are supplied to an inverse orthogonally-transforming unit 32 and subjected to inverse orthogonal transformation processing. When the orthogonal transformation processing is carried out by the FFT, an inverse FFT is carried out, whereas when it is carried out by a WHT, an inverse WHT is carried out.

Note that, in the WHT, an inverse transformation matrix is the same as a forward transformation matrix, which can reduce the scale of a created circuit. An arbitrary number of the pixels obtained by the inverse orthogonal transformation are extracted for each transformation block in a pixel extracting unit 33 and supplied to a central monitoring unit 8.

In contrast, the picture received on a reception side 3 is subjected to the same processing as that of the input side picture by s block dividing unit 11a, an orthogonally-transforming unit 12a, a PN sequence multiplying unit 31a, and an inverse orthogonally-transforming unit 32a. Then, pixels as many as the pixels extracted in the pixel extracting unit 33 are extracted by a pixel extracting unit 33a at the same positions as those of the above pixels and supplied to the central monitoring unit 8.

The central monitoring unit 8 assesses an MSE by performing the processing shown in FIG. 3 based on the extracted pixels from the transmitting side and the reception side.

It can be said that the deterioration of picture quality having a locally abnormal value on a picture region as in the case of occurrence of an error in the digital transmission path has an abnormal value over a wide range on orthogonally transformed spectrum. Accordingly, when signs are changed at random on the orthogonally transformed spectrum, dispersion (spatial dispersion) can be performed effectively. With this operation, it is possible to effectively assess the MSE by selectively extracting pixels having been subjected to the inverse transformation.

Next, a modification of the fifth embodiment will be described with reference to FIG. 8. The modification has a feature in that band restriction filters 34 and 34a and sampling units 35 and 35a are disposed in front of the block dividing units 11 and 11a, respectively. When a time special filter, which imitates, for example, human visual characteristics, is used as the band restriction filters 34 and 34a and the signals having passed through the filters are subjected to the above processing such as the orthogonal transformation, the PN sequence multiplication, and the like, it is possible to assess the deterioration of picture quality weighted with visual characteristics, whereby the quality of a transmitted picture can be automatically remote-monitored based on the deterioration of picture quality near to human subjective assessment of picture quality. Further, a load imposed on an amount of calculation can be reduced by carrying out processing using the sampling units 35 and 35a. Note that the two-dimensional filter disclosed in "Picture movement assessing apparatus" of Japanese Unexamined Patent Publication No. 6-121748 filed by the applicant can be used as an example of the filters 34 and 34a.

Figure 9:
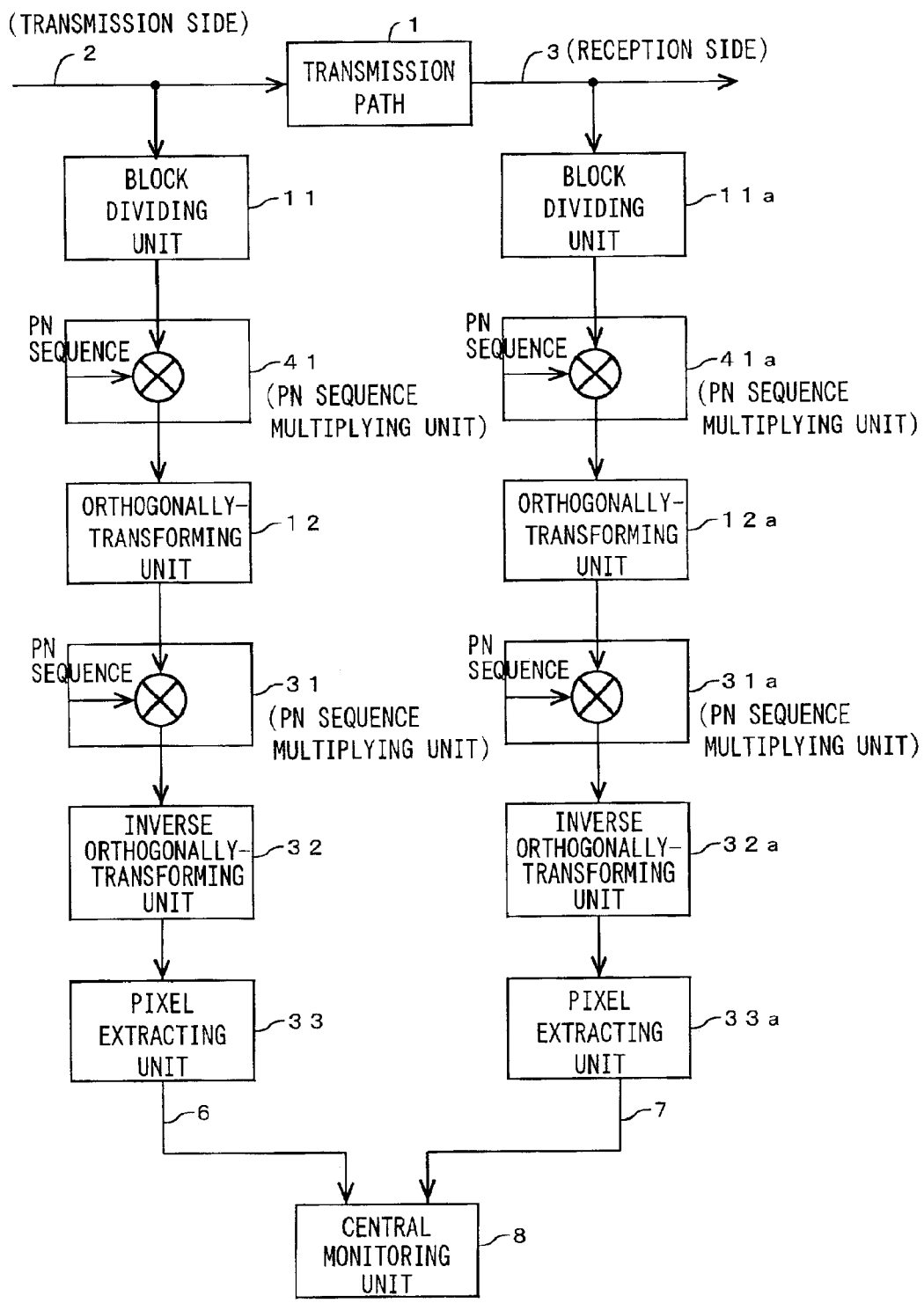
FIG. 9 is a block diagram showing the arrangement of a sixth embodiment.

Next, a sixth embodiment of the present invention will be described with reference to FIG. 9. The sixth embodiment has a feature in that PN sequence multiplying unit 41 and 41a are disposed in front of the orthogonally-transforming units 12 and 12a of FIG. 7, and the other arrangement of the embodiment is the same or similar to that of FIG. 7.

In this embodiment, the pictures of the blocks divided by a block dividing unit 11 are supplied to a PN sequence multiplying unit 41, similarly to the second and third embodiment, and subjected to spectrum diffusion therein. Then, the resultant pictures are supplied to an orthogonally-transforming unit 12 and subjected to an orthogonal transformation therein. Subsequently, the pictures having been subjected to the orthogonal transformation are supplied to a PN sequence multiplying unit 31, similarly to the fifth embodiment, and subjected to spectrum diffusion therein.

Since the subsequent operation of the sixth embodiment is similar to that of the fifth embodiment, the description thereof is omitted.

According to the sixth embodiment, since the PN sequence is multiplied before and after the orthogonal transformation, the pictures can be effectively diffused with respect to deterioration in a wide range such as coding noise, and the like and to local deterioration due to an transmission path error, and the like, thereby it is possible to precisely assess the deterioration of signal to noise ratio of a received picture.

Figure 8:
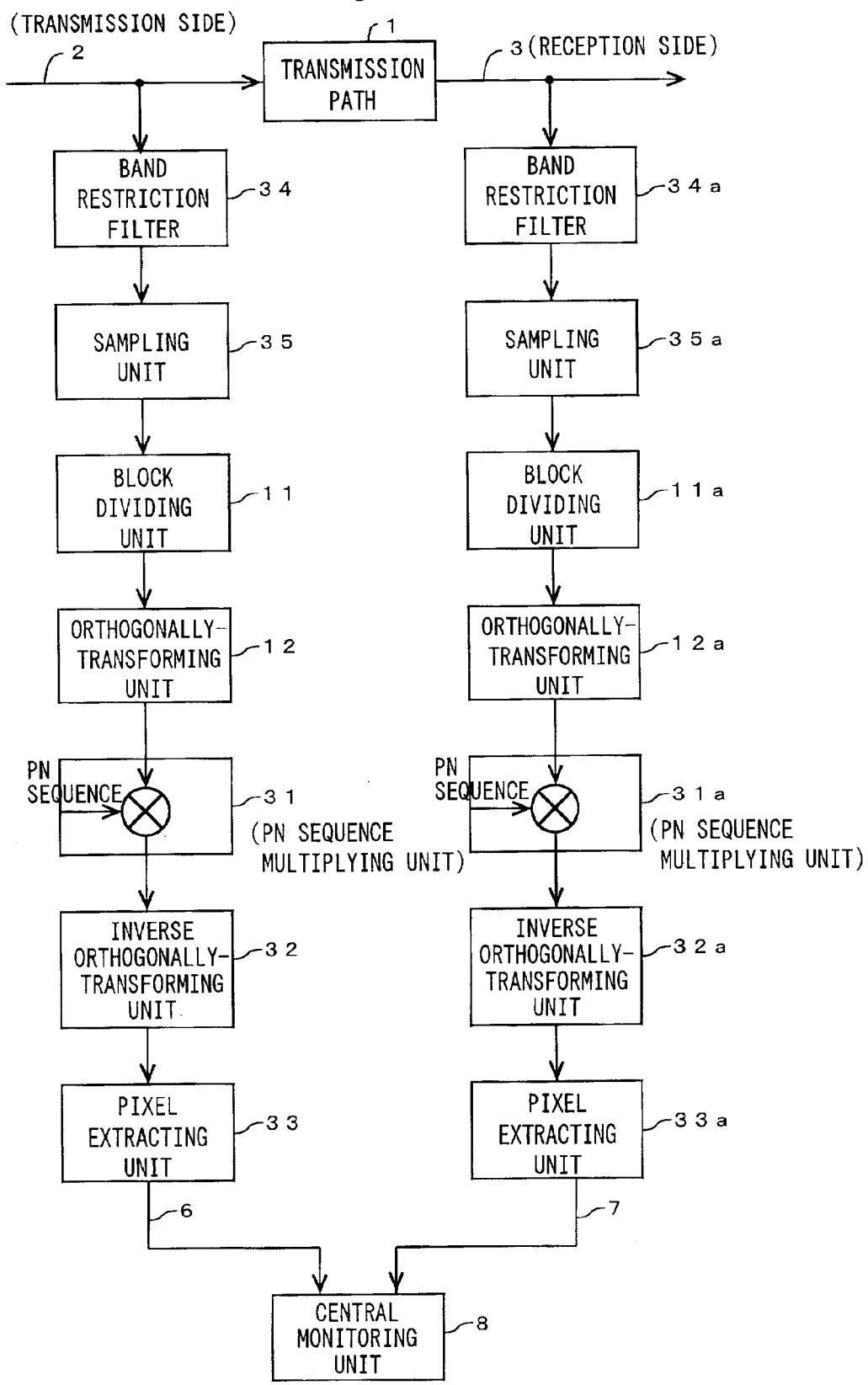
FIG. 8 is a block diagram showing a modification of the fifth embodiment.

Note that, as a modification of the sixth embodiment, band restriction filters 34 and 34a and sampling units 35 and 35a may be disposed in front of the block dividing units 11 and 11a, as shown in FIG. 8. The provision of the components permits to assess the deterioration of picture quality weighed with visual characteristics as well as to reduce a load imposed on an amount of calculation.

As apparent from the above description, according to the present invention, it is possible to effectively assess an MSE even if the transmission path between the respective points of a chain and a central monitoring unit is thin, thereby the quality of a picture in transmission can be precisely remote-monitored.

Further, since the orthogonal transformation is carried out after the completion of the PN sequence multiplication in the present invention, the quality of the picture in transmission can be precisely remote-monitored with respect to the deterioration thereof in a wide range such as coding noise, and the like.

In the present invention, the amount of calculation can be reduced without sacrificing the precision of assessed quality of the picture in transmission by using, in particular, the WHT as the orthogonal transformation. That is, the precise remote-monitoring of the picture in transmission can be simply realized. Further, it is not necessary to transmit a real part and an imaginary part in the present invention, which permits the MSE to be effectively assessed using a small amount of extracted data.

Further, since the PN sequence multiplication is carried out after the completion of the orthogonal transformation in the present invention, the quality of the picture in transmission can be precisely remote-monitored with respect to local deterioration due to a transmission path error, and the like.

Further, since the PN sequence multiplication is carried out before and after the orthogonal transformation in the present invention, the quality of the picture in transmission can be precisely remote-monitored with respect to the deterioration of picture quality in a wide range such as coding noise and to the local deterioration thereof due to the transmission path error, and the like.

Further, in the present invention, it is possible to assess an MSE weighted with visual characteristics because a picture is processed after it has been passed through the filters imitating the visual characteristics. That is, the remoter-monitoring of the quality of the picture in transmission can be realized based on a human subjective assessment.

The first to sixth embodiments are arranged such that a picture is divided into blocks each having a certain size, the respective divided blocks are subjected to the orthogonal transformation, the transformation coefficients thereof are extracted, and the extracted transformation coefficients are supplied to the central monitoring unit so that it assesses the quality of a picture in transmission. To arrange a device for subjecting the blocks into which the picture is divided to the orthogonal transformation, it is contemplated to apply the Walsh Hadamard transformation (WHT) or the Fourier transformation (FFT) as shown, for example, in FIGS. 4 and 5, or to apply a discrete cosine transformation, or the like as the orthogonal transformation.

It is conventionally known to preferably use a high speed calculation system to suppress a scale of hardware for the transformation. When the high speed calculation system is used, it is necessary to set a block size to a power of "2", which restricts the use of the system. Further, an increase in the size of a block that is subjected to orthogonal transformation requires a larger scale of the hardware.

Accordingly, it is preferable that the block have a size as small as possible and that the size be restricted by a power of "2". However, the following two problems arise here.

(1) The screen size of a standard television (SDTV) and a high definition television (HDTV) is not a power of "2". That is, the screen size of the standard television is, for example, 720 (pixels)×486 (rows), and the screen size of the high definition television is 1920 (pixels)×1080 (rows). Accordingly, important from a practical point of view is a manner of applying a block having a size expressed by a power of "2" to the standard television, the high definition television, and the like.

(2) When the block size is small, the number of blocks for covering the overall screen increases. As a result, the number of extracted transformation coefficients to be transmitted to the central monitoring unit cannot help being increased. Thus, when only thin monitoring lines are available, it is difficult to apply the monitoring apparatus according to the present invention.

To cope with the above problem, a main object of the embodiments described below is to provide an apparatus capable of creating a block to which a simple orthogonal transformation, which is suitably arranged as a device, can be effectively applied.

Figure 10:
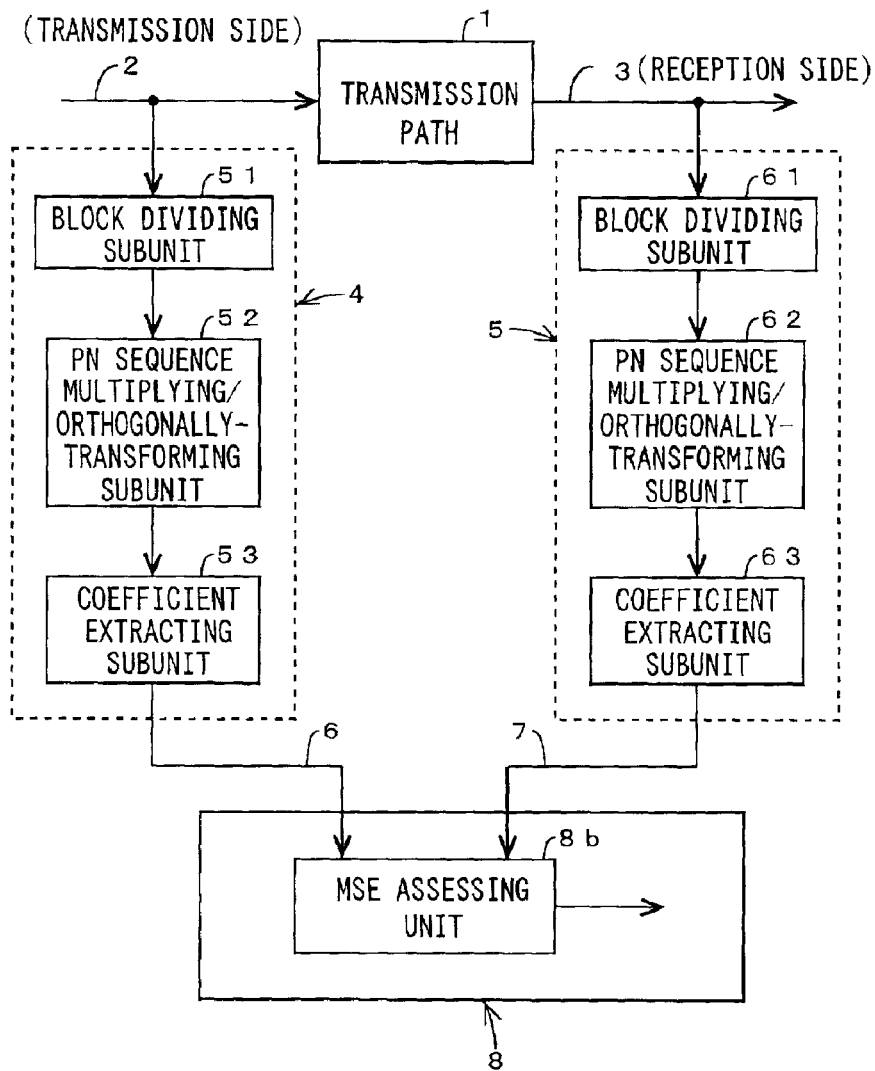
FIG. 10 is a block diagram showing the arrangement of a seventh embodiment.
Figure 11:
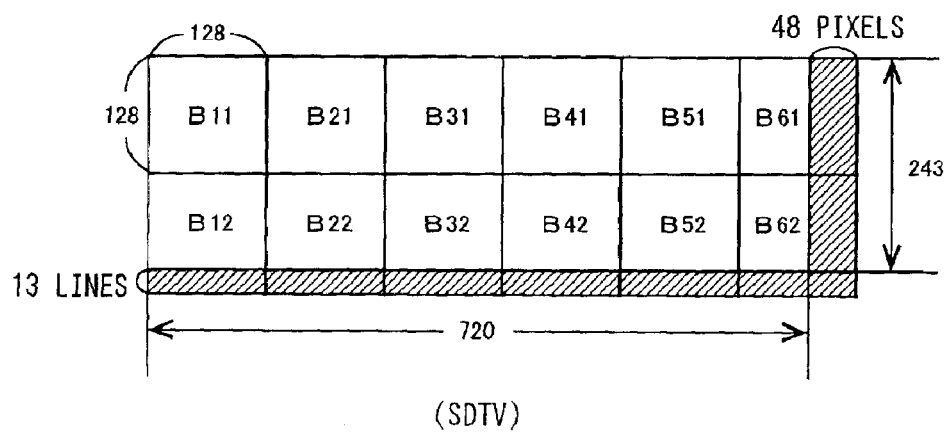
FIG. 11 is a conceptual view of a block division of the seventh embodiment.

A seventh embodiment of the present invention will be described with reference to FIGS. 10, 11, and 12. FIG. 10 is a schematic block diagram of an apparatus for monitoring quality of a picture in transmission to which the seventh embodiment is applied, wherein the same reference numerals as those used in FIG. 1 denote the same components or similar components.

In FIG. 10, a picture is transmitted from a transmission side 2 to a reception side 3 through a transmission path 1. A first characteristic value extracting unit 4 is composed of a block dividing subunit 51, a PN sequence multiplying/orthogonally-transforming subunit 52, and a coefficient extracting subunit 53, and extracts a characteristic value from the picture transmitted from the transmission side 2. A second characteristic value extracting unit 5, which has the same arrangement as that of the first characteristic value extracting unit 4, is composed of a block dividing subunit 61, a PN sequence multiplying/orthogonally-transforming subunit 62, and a coefficient extracting subunit 63. Then, the second characteristic value extracting unit 5 extracts a characteristic value from the picture received on the reception side 3.

The characteristic values extracted in the first and second characteristic value extracting units 4 and 5 are supplied to a central monitoring unit 8 through low speed lines 6 and 7 such as phone lines or LAN lines. The central monitoring unit 8 assesses an MSE (mean square error) from these characteristic values in an MSE assessing unit 8b.

The first characteristic value extracting unit 4 divides the input picture (picture to be transmitted) into blocks each having a predetermined size in the block dividing subunit 51, subjects the blocks to a spectrum diffusion and an orthogonal transformation in the PN sequence multiplying/ orthogonally-transforming subunit 52, and then extracts an appropriate coefficient from the coefficients obtained by the orthogonal transformation in the coefficient extracting subunit 53. Note that the description of operation of the second characteristic value extracting unit 5 is omitted here because it is similar to that of the first characteristic value extracting unit 4.

As described above, in the apparatus for monitoring quality of a picture in transmission of the seventh embodiment, the PN sequence multiplying/orthogonally-transforming subunits 52 and 62 act as an important factor. When the orthogonally-transforming subunits of the PN sequence multiplying/orthogonally-transforming subunit 52 and 62 is arranged devices, a well-known high speed algorism is generally used in many cases. This is because it can simply execute an orthogonal transformation calculation that requires a very large scale in an ordinary method. This high speed algorism is disclosed in, for example, R. J. Clarke, "Transform coding of images", Academic Press, Microelectronics and Signal Processing Series, 1985, pp. 291–335. However, the high speed algorism has a restriction in the size of a block to be orthogonally transformed. That is, both the longitudinal and lateral lengths of the block must be a power of "2".

Further, in general, an increase in the bock size greatly increases an amount of calculation in the orthogonal transformation, and thus it is important to reduce the block size when the orthogonal transformation is arranged as a device.

To satisfy the above requirement, the inventor arranges a block by inserting a virtual pixel value (dummy bit), which is not included in an original picture, into the block and extracts coefficient values obtained by subjecting a picture to an orthogonal transformation by sampling in order to assess picture quality as precisely as possible while maintaining the size of the block to a power of "2" as well as keeping the block in a small size.

Next, the seventh embodiment will be specifically described with reference to FIG. 11. For example, one field of a standard television (hereinafter, abbreviated as "SDTV") is composed of 720 pixels in a horizontal direction×243 lines in a vertical direction, as shown in the figure. At this time, when a block size is set to, for example, 128×128 ($2^7 \times 2^7$), six pieces of blocks (for example, $B_{11}$ to $B_{61}$) and two pieces (for example, $B_{11}$ to $B_{12}$) of blocks must be arranged in a horizontal direction and a vertical direction, respectively to cover the one field.

At this time, when it is intended to align the upper left end of a screen with that of blocks, there exist portions that are not contained in the screen in the blocks of the rightmost column and in the blocks of the lowermost row. That is, since 128×6=768, and 128×2=256, 48×128 pixels are not included in each block of the rightmost column, and 128×13 pixels are not included in each block of the lowermost row, that is, blank spaces including no pixel arise.

To cope with this problem, the block dividing subunits 51 and 61 virtually bury arbitrary a given value, for example, a dummy bit "128" (=one half $2^8$) in the blank spaces of the blocks of the rightmost column and the lowermost row and supply the above blocks to the PN sequence multiplying/ orthogonally-transforming subunits 52 and 62. The PN sequence multiplying/orthogonally-transforming subunits 52 and 62 subject the blocks supplied thereto the spectrum diffusion and the orthogonal transformation, and the coefficient extracting subunits 53 and 63 extract arbitrary orthogonal transformation coefficients $f_i$ and $f_i'$ (however, coefficients at the same position in the same block) from the resultant orthogonal transformation coefficients in the number of one piece or a plurality of pieces per block and supply them to the MSE assessing unit 8b of the central monitoring unit 8.

Operation of the MSE assessing unit 8b will be described with reference to the flowchart of FIG. 12. The MSE assessing unit 8b obtains the coefficients $f_i$ and $f_i'$ from the coefficient extracting subunits 53 and 63 at step S1. It is determined at step 2 whether or not the coefficients $f_i$ and $f_i'$ are the coefficients of the blocks in which the dummy bit is buried. When they are the coefficients of the blocks in which the dummy bits are not buried, the process goes to step S3 and an MSE is determined by the above formula (4), and the like. That is, the MSE can be determined from $|f_i-f_i'|^2$. Note that when the coefficient extracting subunits 53 and 63 extract a plurality of orthogonal transformation coefficients per block, the MSE can be determined from the mean of a plurality of $|f_i-f_i'|^2$.

In contrast, when the orthogonal transformation coefficients $f_i$ and $f_i'$ are those of the blocks in which the dummy bit is buried (the determination at step S2 is "YES"), the process goes to step S4 and corrects the MSE to S/(S−K)·MSE. Here, S shows the area of each block and K shows an area S of a block filled with the dummy bit.

The reason why the MSE is corrected as described above is shown below. All the picture data supplied from the transmission side 2 to the reception side 3 through the transmission path 1 is the picture in effective picture regions, and the regions in which the dummy bit is virtually buried are not transmitted. Therefore, an MSE that is desired to determined actually is the deterioration of quality of the picture in the overall effective screen region. However, the MSE calculated in the MSE assessing unit 8b is the value affected by the dummy bit buried in the block dividing subunits 51 and 61 as to the blocks in which the dummy bit is buried. Further, the dummy bits are not subjected to the deterioration of picture quality at all because they do not pass through the transmission path 1, and the like.

Thus, when it is conceived that the MSE of the blocks assessed by the formula (4), and the like shows the mean value per pixel when it is assumed that the overall blocks are uniformly deteriorated, the assessed value of an intrinsic MSE of the effective screen portion in the blocks including the regions in which the dummy bit is virtually buried is S/(S−K)·MSE.

Next, it is determined at step S5 whether or not the MSEs of all the blocks of one picture are determined. When the determination is "NO", the process goes to steps S6 and S1 where the coefficient of the next block is supplied to the MSE assessing unit 8b. When the above processing is continued and the all processing of one picture is finished (determination at step S5 is "YES"), the process goes to step S7 and determines whether or not the processing of an overall picture sequence is finished. When the determination at step 7 is "NO", the process goes to steps S8 and S1, and the MSE assessing unit 8b obtains the coefficients of the blocks of the next picture.

When the above processing is continued and the processing of the overall picture sequence is finished (determination at step S7 is "YES"), the process goes to step S9 where the assessed value of the MSE of the overall picture sequence is calculated as described below. That is, when the MSEs of the blocks (n pieces in total) the interiors of which are entirely occupied by an effective picture is shown by $MS_1$, $MS_2$, ... $MS_n$, the assessed values of the MSEs of the blocks (m pieces in total) the right portions (area: KR) of the interiors of which are located externally of the picture are shown by $MR_1$, $MR_2$, ... $MR_m$, the assessed values of the MSEs of the blocks (p pieces in total) the lower portions (area: KB) of the interiors of which are located externally of the picture are shown by $MB_1$, $MB_2$, ... $MB_p$, and the assessed values of the MSEs of the blocks (q pieces in total) the lower right portions (area: KBR) of the interiors of which are located externally of the picture are shown by $MBR_1$, $MBR_2$, ... $MBR_q$, the assessed value of the MSE of the overall picture sequence is expressed by the following formula (9). Note that the formula (9) takes MSE←S/(S−K)·MSE described above into consideration.

$$MSE = \left[\sum_{i=1}^{n} SMS_i + \sum_{i=1}^{m}(S-KR)\frac{S}{S-KR}MR_i + \sum_{i=1}^{p}(S-KB)\frac{S}{S-KB}MB_i + \sum_{i=1}^{q}(S-KBR)\frac{S}{S-KBR}MBR_i\right] / \qquad (9)$$

$$[Sn + (S-KR)m + (S-KB)p + (S-KBR)q]$$

$$= \frac{S}{Sn + (S-KR)m + (S-KB)p + (S-KBR)q}\left[\sum_{i=1}^{n} MS_i + \sum_{i=1}^{m} MR_i + \sum_{i=1}^{p} MB_i + \sum_{i=1}^{q} MBR_i\right]$$

Note that, when one screen is shown exactly by a power of "2" as a special case, the formula (9) agrees with the above formula (4) because all of the KR, KB, KBR, m, p, and q are 0.

Next, an eighth embodiment of the present invention will be described with reference to FIG. 13. In FIG. 13, the same reference numerals as those used in FIG. 1 denote the same components or similar components. In the eight embodiment, a first characteristic value extracting unit 4 is composed of a sampling block dividing subunit 72, a PN sequence multiplying/orthogonally-transforming subunit 73, and a coefficient extracting subunit 74. Further, a second characteristic value extracting unit 5 is composed of a sampling block dividing subunit 82, a PN sequence multiplying/orthogonally-transforming subunit 83, and a coefficient extracting subunit 84 each arranged similarly to a corresponding one of the first characteristic value extracting unit 4. Note that band restriction filters 71 and 81 may omitted because they are not always necessary. However, the employment of these filters 71 and 81 permits the affect of a local breakage of pixels that are not sampled to be detected.

Next, operation of the eighth embodiment will be described. When a case in which a screen has the size of a standard television (one field is composed of 720 pixels in a horizontal direction×243 lines in a vertical direction) is considered similarly to the seventh embodiment and it is intended to divide the screen into blocks each having a size of 8×8 pixels that can be simply arranged as a device, the number of the blocks is (720/8)×{the value obtained by raising as a unit the fractional portion of 243/8}=2790 pieces. When it is assumed that only one coefficient is extracted from one block and that the bit precision expressed by the coefficient is 10 bits, the amount of information of the coefficients extracted from one field is 27.9 K bits (=2790× 10), that is, 1.674 M bps (=27.9×60). Since this amount of information is too large when it is transmitted through low speed monitoring lines 6 and 7 such as phone lines and LAN lines, it is necessary to reduce the data amount by some kind or another method. However, when if data is extracted from only a portion of the screen to reduce the data amount, there is a possibility that a local breakage of a picture, which is typical in a digital transmission error, is overlooked.

To cope with this problem, in the eighth embodiment, discrete pixels are arranged as one block in place of arranging adjacent pixels as one block.

In FIG. 13, a transmitted picture and a received picture are divided into blocks by the sampling block dividing subunits 72 and 82, respectively. The sampling block dividing subunits 72 and 82 sample these pictures at a ratio of 1 pixel per eight pixels in both horizontal and vertical directions, and one block is composed of 8×8 pixels sampled as described above. Accordingly, the number of blocks created by the sampling block dividing subunits 72 and 73 is 1/64 the above 2790 pieces, that is, 44 pieces. Thus, the data amount transmitted through the low speed monitoring lines 6 and 7 is 26.4 K bps which is an amount capable of being transmitted through the low speed lines 6 and 7.

Note that sampling one pixel from eight pixels is appropriate from the following reason. That is, since MPEG-2 ordinarily used to compress and transmit a motion picture performs processing in a block unit of 8×8 pixels, an affect (breakage) to a picture due to a transmission path error, and the like is liable to appear in the block unit. Accordingly, one sample obtained from each block of 8×8 pixels can satisfy minimum needs necessary to monitoring.

Next, the blocks obtained in the sampling block dividing subunits 72 and 82 are subjected to a spectrum diffusion in the PN sequence multiplying/orthogonally-transforming subunits 73 and 83 so that pixel data is averaged and then is subjected to an orthogonal transformation, thereby the coefficients of the same position are extracted by the coefficient extracting subunits 74 and 84. The coefficients $f_i$ and $f_i'$ extracted in the coefficient extracting subunits 74 and 84 are supplied to the MSE assessing unit 8c of a central monitoring unit 8 through the low speed lines 6 and 7. The MSE assessing unit 8c assesses an MSE by the above formula (4), and the like.

As apparent from the above description, according to the eighth embodiment, it is possible to apply the orthogonal transformation in a size of a power of "2" to a screen having an arbitrary size by burying a predetermined given value in blocks having regions outside of the effective screen of a picture. With this arrangement, the present invention can use the high speed orthogonal transformation which can be relatively easily arranged as a device, thereby a transmission monitoring apparatus can be simplified.

Further, according to the eighth embodiment, when a picture is divided into blocks, the respective blocks are arranged by sampling discrete pixels in place of sampling adjacent pixels. Accordingly, a wide range on a screen can be entirely monitored using the blocks having a relatively small size. That is, the transmission monitoring apparatus can be miniaturized.

What is claimed is:

1. An apparatus for monitoring quality of picture in transmission for monitoring the quality of a picture being transmitted through a picture transmission path connected in series to a plurality of transmission apparatuses, comprising:

characteristic value extraction means for extracting the characteristic values of picture quality at a plurality of points on the picture transmission path; and MSE assessment means for assessing an MSE (mean square error) from the characteristic values extracted by the characteristic value extraction means, wherein:

the characteristic value extraction means comprises block division means for dividing an input picture into blocks each having an arbitrary size, orthogonal transformation means for subjecting the pictures in the blocks to an orthogonal transformation, and frequency component value extraction means for extracting an arbitrary frequency component value of the orthogonal transformation; and the MSE assessment means comprises square calculation means for selecting frequency component values at two arbitrary points from the frequency component values supplied from the plurality of points and determining the square value of the difference between corresponding frequency component values, addition means for adding an arbitrary number of the square values, and picture quality deterioration assessment means for assessing the deterioration of picture quality from the added value obtained by the addition means.

2. An apparatus for monitoring quality of picture in transmission according to claim 1, wherein:

the characteristic value extraction means comprises PN sequence multiplication means disposed in front of the orthogonal transformation means for multiplying signals in the blocks by a sequence having +1 and −1 at random; and the signals in the blocks are subjected to the orthogonal transformation after the execution of the PN sequence multiplication.

3. An apparatus for monitoring quality of picture in transmission according to claim 1, wherein the orthogonal transmission means uses Walsh Hadamard transformation (WHT) as orthogonal transformation.

4. An apparatus for monitoring quality of picture in transmission according to claim 1, wherein the orthogonal transformation means uses Fourier transformation as orthogonal transformation.

5. An apparatus for monitoring quality of picture in transmission according to claim 4, wherein when the frequency component value extraction means extracts an arbitrary frequency component value, the extraction means extracts only an amplitude value in place of extracting a real part and an imaginary part.

6. An apparatus for monitoring quality of picture in transmission according to claim 1, further comprising filter means disposed in front of the characteristic value extraction means for filtering the input picture.

7. An apparatus for monitoring quality of picture in transmission for monitoring the quality of a picture being transmitted through a picture transmission path connected in series to a plurality of transmission apparatuses, comprising:

characteristic value extraction means for extracting the characteristic values of picture quality at a plurality of points on the picture transmission path; and MSE assessment means for assessing an MSE (mean square error) from the characteristic value extracted by the characteristic value extraction means, wherein:

the characteristic value extraction means comprises block division means for dividing an input into blocks each having an arbitrary size, orthogonal transformation means for subjecting the signals in the blocks to an orthogonal transformation, PN sequence multiplication means for multiplying orthogonal transformation coefficients by a sequence having +1 and −1 at random, inverse orthogonal transformation means for subjecting the PN multiplied coefficients to an inverse orthogonal transformation, and pixel extraction means for extracting arbitrary pixel values from the pixels obtained by the inverse orthogonal transformation; and the MSE assessing means comprises square calculation means for selecting frequency component values at two arbitrary points from the frequency component values supplied from the plurality of points and determining the square value of the difference between corresponding frequency component values, addition means for adding an arbitrary number of the square values, and picture quality deterioration assessment means for assessing the deterioration of picture quality from the added value obtained by the addition means.

8. An apparatus for monitoring quality of picture in transmission according to claim 7, wherein the characteristic value extraction means further comprises PN sequence multiplication means disposed in front of the orthogonal transformation means for multiplying the signals in the blocks by a sequence having +1 and −1 at random.

9. An apparatus for monitoring quality of picture in transmission for monitoring the quality of a picture being transmitted through a picture transmission path connected in series to a plurality of transmission apparatuses, comprising:

characteristic value extraction means for extracting the characteristic value of picture quality at a plurality of points on the picture transmission path; and MSE assessment means for assessing an MSE (mean square error) based on the data supplied thereto from the characteristic value extraction means through phone lines or LAN lines, wherein:

the characteristic value extraction means comprises block division means for dividing an input picture into blocks each having a square shape of a power of "2", orthogonal transformation means for subjecting the pictures in the blocks to an orthogonal transformation, and frequency component value extraction means for extracting an arbitrary frequency component value of the orthogonal transformation; and the block division means buries a predetermined value in blocks having regions outside of the effective screen of a picture and arranges the blocks as square blocks of the power of "2".

10. An apparatus for monitoring quality of picture in transmission according to claim 9, wherein the MSE assessment means corrects the MSE of each of the blocks in which the predetermined value is buried to S/(S-K) MSE, where S shows the area of each block, and K shows the area, in which the predetermined value is buried, of the area S of each block.

11. An apparatus for monitoring quality of picture in transmission for monitoring the quality of a picture being transmitted through a picture transmission path connected in series to a plurality of transmission apparatuses, comprising:

characteristic value extraction means for extracting the characteristic values of picture quality at a plurality of points on the picture transmission path; and MSE assessment means for assessing an MSE (mean square error) based on the data supplied thereto from the characteristic value extraction means through phone lines or LAN lines, wherein:

the characteristic value extraction means comprises block division means for dividing an input picture into blocks each having a square shape of a power of "2" by sampling discrete pixels of the input picture, orthogonal transformation means for subjecting the pictures in the blocks to an orthogonal transformation, and frequency component value extraction means for extracting an arbitrary frequency component value of the orthogonal transformation.

12. An apparatus for monitoring quality of picture in transmission according to claim 11, wherein the block division means samples a pixel from the 8×8 pixels of the input picture.

* * * * *